US012235135B2

(12) United States Patent
Schmitt et al.

(10) Patent No.: US 12,235,135 B2
(45) Date of Patent: Feb. 25, 2025

(54) MAGNETIC SENSOR SYSTEM WITH INITIALIZATION MECHANISM

(71) Applicant: Analog Devices International Unlimited Company, Limerick (IE)

(72) Inventors: Jochen Schmitt, Biedenkopf (DE); Aude Richard, Limerick (IE); Michael Mueller-Aulmann, Niedererbach (DE)

(73) Assignee: Analog Devices International Unlimited Company, Limerick (IE)

( * ) Notice: Subject to any disclaimer, the term of this patent is extended or adjusted under 35 U.S.C. 154(b) by 2 days.

(21) Appl. No.: 17/688,255

(22) Filed: Mar. 7, 2022

(65) Prior Publication Data

US 2022/0326049 A1      Oct. 13, 2022

Related U.S. Application Data

(60) Provisional application No. 63/173,914, filed on Apr. 12, 2021.

(51) Int. Cl.
*G01D 5/16*      (2006.01)
*G01D 5/14*      (2006.01)

(52) U.S. Cl.
CPC .............. *G01D 5/16* (2013.01); *G01D 5/142* (2013.01)

(58) Field of Classification Search
CPC ............ G01D 5/12; G01D 5/14; G01D 5/142; G01D 5/145; G01D 5/16; G01R 33/00;
(Continued)

(56) References Cited

U.S. PATENT DOCUMENTS 5,045,741 A * 9/1991 Dvorsky ................. H02K 7/125
                                                           310/80
5,570,015 A * 10/1996 Takaishi ................. G01D 5/145
                                                           137/554
(Continued)

FOREIGN PATENT DOCUMENTS

EP          3387387 B1      10/2019
EP          3771916 A1      2/2021

OTHER PUBLICATIONS

"German Application Serial No. 102020132914.8, Office Action mailed Sep. 16, 2021", w/o English translation, 9 pgs.
(Continued)

*Primary Examiner* — Huy Q Phan
*Assistant Examiner* — David B Frederiksen
(74) *Attorney, Agent, or Firm* — Schwegman Lundberg & Woessner, P.A.

(57) ABSTRACT

The present disclosure provides magnetic sensor system that includes a magnet mounted on the end of a rotating shaft, a magnetic sensing device comprising a magnetic multi-turn sensor, and a mechanism for initializing the magnetic multi-turn sensor into a known state ready for use. Whilst the magnetic sensing device is being used to monitor the rotation of the shaft, the magnet is located in a starting position a first distance from the magnet sensing device such that the magnet field strength experienced by the magnet sensing device is within the operating window of the magnet multi-turn sensor, the operating window being defined by a minimum magnetic flux density, Bmin, and a maximum magnetic flux density, Bmax. The mechanism comprises a means for moving the magnet and the shaft in an axial direction towards the magnet sensing device such that the magnetic field experienced by the magnet sensing device exceeds the upper limit, Bmax, of the operating window. This causes domain wall nucleation, whereby the sensor spiral is filled (Continued)

with domain walls that magnetise all of the magnetoresistive elements into the same state. Once the initialization has taken place, the mechanism is configured to return the magnet to its starting position ready for use. In this respect, the mechanism may have a biasing means such as a spring that biases the magnet towards the starting position.

20 Claims, 5 Drawing Sheets

(58) Field of Classification Search
CPC .................. G01R 33/02; G01R 33/06; G01R 33/09–098
See application file for complete search history.

(56) References Cited

U.S. PATENT DOCUMENTS

| | | | | |
|---|---|---|---|---|
| 5,936,293 | A * | 8/1999 | Parkin | G01R 33/06 365/158 |
| 6,377,005 | B1 * | 4/2002 | Zintler | E05B 81/64 318/653 |
| 10,670,386 | B2 | 6/2020 | Zimmer et al. | |
| 10,782,153 | B2 | 9/2020 | Schmitt | |
| 10,830,613 | B2 | 11/2020 | Tonge et al. | |
| 10,859,406 | B2 | 12/2020 | Richard et al. | |
| 2002/0043880 | A1 * | 4/2002 | Suzuki | H02K 7/06 310/80 |
| 2002/0060564 | A1 * | 5/2002 | Yasuda | G01D 11/245 324/207.2 |
| 2005/0030012 | A1 * | 2/2005 | Kunz-Vizenetz | G01D 5/145 324/207.25 |
| 2011/0175601 | A1 * | 7/2011 | Bogos | G01D 5/14 324/207.25 |
| 2012/0098534 | A1 * | 4/2012 | Hertel | G01R 33/1292 377/64 |
| 2013/0015844 | A1 * | 1/2013 | Bogos | G01D 18/001 324/207.2 |
| 2014/0197822 | A1 * | 7/2014 | Ritter | G01R 33/072 324/207.21 |
| 2016/0041003 | A1 * | 2/2016 | Hayakawa | G01D 5/145 324/207.25 |
| 2016/0265941 | A1 * | 9/2016 | Mattheis | G01R 33/098 |
| 2017/0261345 | A1 | 9/2017 | Schmitt | |
| 2019/0242764 | A1 * | 8/2019 | Nicholl | B62D 15/0215 |
| 2019/0383643 | A1 | 12/2019 | Schmitt et al. | |
| 2019/0383645 | A1 | 12/2019 | Tonge et al. | |
| 2020/0300938 | A1 | 9/2020 | Schmitt et al. | |
| 2021/0372821 | A1 | 12/2021 | Schmitt et al. | |
| 2024/0004001 | A1 | 1/2024 | Schmitt et al. | |

OTHER PUBLICATIONS

U.S. Appl. No. 18/265,133, filed Jun. 2, 2023, An Initialisation Device.

* cited by examiner

MAGNETIC SENSOR SYSTEM WITH INITIALIZATION MECHANISM

FIELD OF THE INVENTION

The present disclosure relates to a magnetic sensor system. In particular, the present disclosure relates to a magnetic sensor system comprising a magnetic mufti-turn sensor and a mechanism for initializing the magnetic multi-turn sensor.

BACKGROUND

Magnetic multi-turn (MT) sensors are commonly used in applications where there is a need to monitor the number of times a device has been turned. An example is a steering wheel in a vehicle. Magnetic multi-turn sensors typically use magnetoresistive elements that are sensitive to an applied external magnetic field. The resistance of the magnetoresistive elements in multi-turn sensors can be changed by rotating a magnetic field within the vicinity of the sensor. Variations in the resistance of the magnetoresistive elements can be tracked to determine the number of turns in the magnetic field, which can be translated to a number of turns in the device being monitored.

The magnetic turn count information stored in the sensor needs to match the physical turn count of the device the sensor is monitoring, and so the sensor must first be set in a known magnetic state before it can be used. The magnetoresistive elements therefore need to be magnetically initialized into one of two states, such that all the sensor outputs will be the same at either the start point of the mechanical system (i.e. zero turns of the magnetic field) or the end point (i.e. the maximum number of turns that the sensor can count), for example, all having either a "high" reading or a "low reading". This is called the initialization state.

SUMMARY

The present disclosure provides magnetic sensor system that includes a magnet mounted on the end of a rotating shaft, a magnetic sensing device comprising a magnetic multi-turn sensor, and a mechanism for initializing the magnetic multi-turn sensor into a known state ready for use. Whilst the magnetic sensing device is being used to monitor the rotation of the shaft, the magnet is located in a starting position a first distance from the magnet sensing device such that the magnet field strength experienced by the magnet sensing device is within the operating window of the magnet multi-turn sensor, the operating window being defined by a minimum magnetic flux density, Bmin, and a maximum magnetic flux density, Bmax. The mechanism comprises a means for moving the magnet and the shaft in an axial direction towards the magnet sensing device such that the magnetic field experienced by the magnet sensing device exceeds the upper limit, Bmax, of the operating window. This causes domain wall nucleation, whereby the sensor spiral is filled with domain walls that magnetise all of the magnetoresistive elements into the same state. Once the initialization has taken place, the mechanism is configured to return the magnet to its starting position ready for use. In this respect, the mechanism may have a biasing means such as a spring that biases the magnet towards the starting position.

A first aspect of the present disclosure provides a magnetic sensor system, comprising a magnetic sensing device, the magnetic sensing device at least comprising a magnetic mufti-turn sensor, wherein the magnetic multi-turn sensor comprises a plurality of magnetoresistive sensing elements, a magnet mounted on a rotatable shaft, the magnet being positioned a first distance from the magnetic sensing device such that the magnetic multi-turn sensor is operable to measure a number of turns of a magnetic field generated by the magnet, and an initialization mechanism configured to move the magnet and the rotatable shaft in an axial direction towards the magnetic sensing device, such that when the magnet is at a second distance from the magnetic sensing device, domain walls are generated in the plurality of magnetoresistive elements by the magnet field generated by the magnet.

As such, when the magnet is in the first position, the magnetic field strength experienced by the multi-turn sensor is within the operating window of the multi-turn sensor whereby it will accurately output turn count information. To initialize the multi-turn sensor, such that it is in a known magnetic state, the magnet and shaft are moved axially towards the sensor. In doing so, the magnetic field strength experienced by the multi-turn sensor exceeds the operating window, thereby filling the sensor with domain walls that magnetise all of the magnetoresistive elements into the same state. Once initialized, the magnet and shaft are returned to the starting position ready for use.

It will be appreciated that the first distance is greater than the second distance. The magnetic multi-turn sensor may have an operating window between a first magnetic field strength and a second magnetic field strength, and wherein the magnet field strength experienced by the magnetic sensing device when the magnet is at the second distance is larger than the second magnetic field strength of the operating window.

In some arrangements, the initialization mechanism may comprise a moveable element configured to actuate the shaft in the axial direction. The initialization mechanism may also further comprise a support element arranged around the rotatable shaft and held in a fixed axial position, and a biasing element coupled between the support element and the moveable element, the biasing element being configured to bias the moveable element into a first position, wherein the magnet is at the first distance when the moveable element is in the first position. For example, the biasing element may be a spring. However, it will be appreciated that any means suitable for biasing the moveable element into the first position may be used.

In some arrangements, the initialization mechanism may comprise an alignment mechanism configured to hold the magnet and rotatable shaft in a predefined angular position when the rotatable shaft is being moved in the axial direction towards the magnetic sensing device. For example, the alignment mechanism may comprise a key attached to a side of the rotatable shaft, and an opening on a support element arranged around the rotatable shaft and held in a fixed axial position, wherein the opening is configured to receive the key when the shaft is moved in the axial direction towards the magnetic sensing device. By providing this alignment mechanism whereby the shaft can only be moved in an axial direction when it is in a certain angular position (i.e. when the key is aligned with the opening), this ensures that the initialization takes place when the magnetic field is in the correct orientation. In this respect, the magnetic field direction during initialization must correspond to the magnetic field direction when the rotatable shaft is at either the start point (i.e. corresponding to a zero turn count) or the end point (i.e. corresponding to the maximum turn count).

The initialization mechanism may also comprise a locking mechanism configured to hold the rotatable shaft at a first axial position such that the magnet is at the first distance from the magnetic sensing device, wherein the locking mechanism is unlocked to allow the magnet and the rotatable shaft to be moved in the axial direction. This helps to prevent the shaft from moving in the axial direction, for example, due to vibrations in the external system, whilst it is in normal operation. Any movement in the axial direction will cause variations in the magnetic field strength, which could cause errors in the turn count. For example, the locking mechanism may comprise a retaining ring. However, it will be appreciated that the locking means may be any means suitable for absorbing vibrations that could disrupt the turn count.

The magnetic mufti-turn sensor may be a giant magnetoresistive (GMR) or tunnel magnetoresistive (TMR) based multi-turn sensor.

A further aspect of the present invention provides a method of initializing a magnetic sensing device, the method comprising providing a magnet on a rotatable shaft, providing a magnetic sensing device at least comprising a magnetic multi-turn sensor, wherein the magnetic multi-turn sensor comprises a plurality of magnetoresistive sensing elements, wherein the magnetic sensing device is positioned a first distance from the magnet such that the magnetic multi-turn sensor is operable to measure a number of turns of a magnetic field generated by the magnet, and operating an initialization mechanism configured to move the magnet and the rotatable shaft in an axial direction towards the magnetic sensing device, such that when the magnet is moved to a second distance from the magnetic sensing device, domain walls are generated in the plurality of magnetoresistive elements by the magnet field generated by the magnet.

BRIEF DESCRIPTION OF THE DRAWINGS

The present disclosure will now be described by way of example only with reference to the accompanying drawings in which.

DETAILED DESCRIPTION

Magnetic multi-turn sensors can be used to monitor the turn count of a rotating shaft. To do this, a magnet is typically mounted to the end of the rotating shaft, the multi-turn sensor being sensitive to the rotation of the magnetic field as the magnet rotates with the shaft. Such magnetic sensing can be applied to a variety of different applications, such as automotive applications, medical applications, industrial control applications, consumer applications, and a host of other applications which require information regarding a position of a rotating component.

For counting the number of turns, an xMR multi-turn sensor, typically, giant magnetoresistive (GMR) or tunnel magnetoresistive (TMR), based on domain wall propagation in an open or closed loop spiral is used. The multi-turn sensor may then be used in conjunction with an xMR angle sensor (also referred to as a single turn sensor) for determining the angular position of the rotating shaft within each 360° turn.

Figure 1:
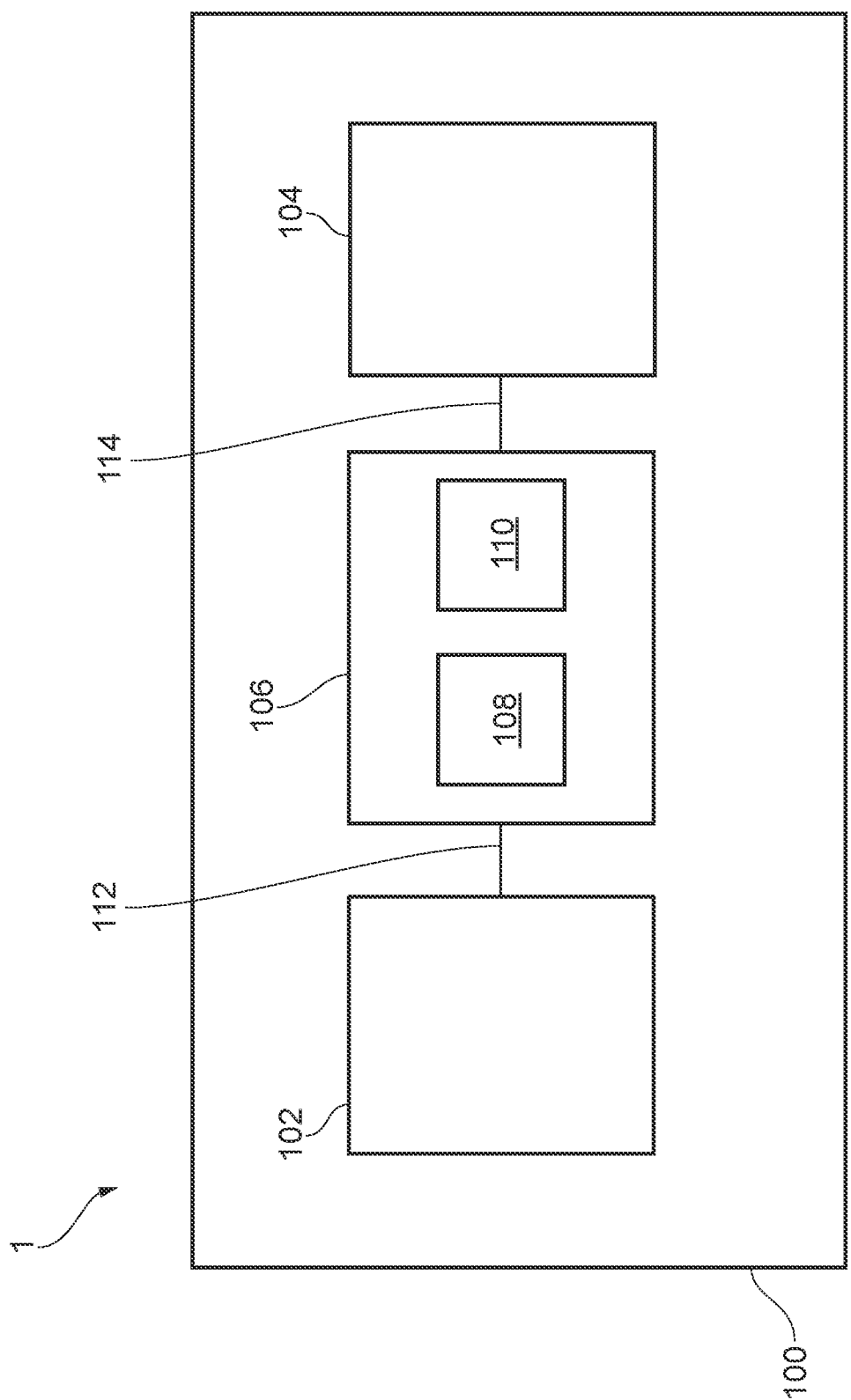
FIG. 1 is an example of a magnetic multi-turn sensor in accordance with embodiments of the disclosure.

FIG. 1 illustrates a schematic block diagram of an example magnetic sensor system 1 that includes an xMR multi-turn (MT) sensor 102. The magnetic sensor system 1 may also include a magnetic single turn (ST) sensor 104, which may be an anisotropic magnetoresistive (AMR), giant magnetoresistive (GMR) or tunnel magnetoresistive (TMR) based position sensor, although it will be appreciated that the magnetic sensor system 1 may be implemented without the ST sensor 104 or with a different type of magnetic sensor.

The sensor system 1 also comprises a processing circuit 106, and an integrated circuit 100 on which the MT sensor 102, the ST sensor 104 and processing circuit 106 are disposed. The processing circuit 106 receives signals $S_{MT}$ 112 from the MT sensor 102 and processes the received signals to determine that the turn count using a turn count decoder 108, which will output a turn count representative of the number of turns of an external magnetic field (not shown) rotating in the vicinity of the MT sensor 102. Similarly, the processing circuit 106 may also receive signals $S_{ST}$ 114 from the ST sensor 104 and process the received signals using a position decoder 110 to output an angular position of the external magnetic field.

Figure 2:
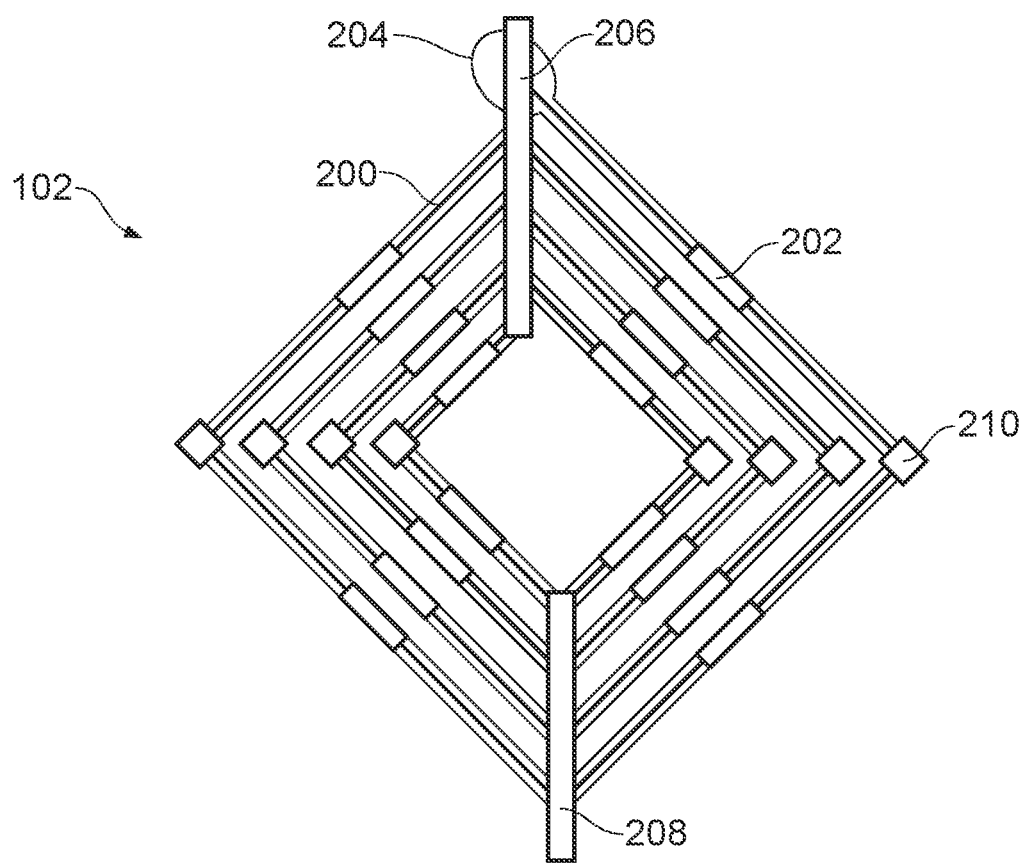
FIG. 2 is a schematic top view of a magnetic sensor package in accordance with embodiments of the disclosure.

FIG. 2 shows an example of a magnetic strip layout representation of the magnetic MT sensor 102 comprising a plurality of magnetoresistive elements 200 that may be used in accordance with the embodiments of the present disclosure. In the example of FIG. 2, the magnetic strip 200 is a giant magnetoresistance (GMR) track that is physically laid out in an open loop spiral configuration, although it will be appreciated that the sensor may also be formed from tunnel magnetoresistive (TMR) material. As such, the magnetic strip 200 has a plurality of segments formed of the magnetoresistive elements 202 arranged in series with each other. The magnetoresistive elements 202 act as variable resistors that change resistance in response to a magnetic alignment state. One end of the magnetic strip 200 is coupled to a domain wall generator (DWG) 204. In this respect, it will be appreciated that the DWG 204 may be coupled to either end of the magnetic strip 200. The DWG 204 generates domain walls in response to rotations in an external magnetic field, or the application of some other strong external magnetic field beyond the operating magnetic window of the sensor 102. These domain walls can then be injected into the magnetic strip 200. As the magnetic domain changes, the resistance of the GMR elements 202 will also change due to the resulting change in magnetic alignment.

In order to measure the varying resistance of the GMR elements 202 as domain walls are generated, the magnetic strip 200 is electrically connected to a supply voltage VDD 206 and to ground GND 208 to apply a voltage between a pair of opposite corners. The corners half-way between the voltage supplies are provided with electrical connections 210 so as to provide half-bridge outputs. As such, the multi-turn sensor 102 comprises multiple Wheatstone bridge circuits, with each half-bridge 210 corresponding to one half-turn or 180° rotation of an external magnetic field. Measurements of voltage at the electrical connections 210 can thus be used to measure changes in the resistance of the GMR elements 202, which is indicative of changes in the magnetic alignment of the free layer.

The example shown by FIG. 2 comprises four spiral windings eight half-bridges 210, and is thus configured to count four turns of an external magnetic field. However, it will be appreciated that a multi-turn sensor may have any number of spiral windings depending on the number of GMR elements. In general, multi-turn sensors can count as many turns as spiral windings. It will also be appreciated that the GMR elements 202 may be electrically connected in any suitable way so as to provide sensor outputs representative of the changes in magnetic alignment state. For example, the GMR elements 202 may be connected in a matrix arrangement such as that described in US 2017/0261345, which is hereby incorporated by reference in its entirety. As a further alternative, each magnetoresistive element 202 may be connected individually, rather than in a bridge arrangement.

As described above, the magnetic turn count information stored in the MT sensor 102 needs to match the physical turn count of the device the MT sensor 102 is monitoring, and so the MT sensor 102 must first be set in a known magnetic state before it can be used. To initialize the MT sensor 102, the mechanical system needs to be driven to either the start or end position, and the sensor spiral filled with domain walls such that the GMR elements 202 all provide the same sensor outputs. Once this has been done, the MT sensor 102 will output a sequence of output signals as the mechanical system rotates that is indicative of the number of turns. The initialization can be done by exposing the MT sensor 102 to a strong magnetic field, however, current solutions are difficult to implement once the magnetic sensor package 100 is assembled and installed in the mechanical system.

Figure 3:
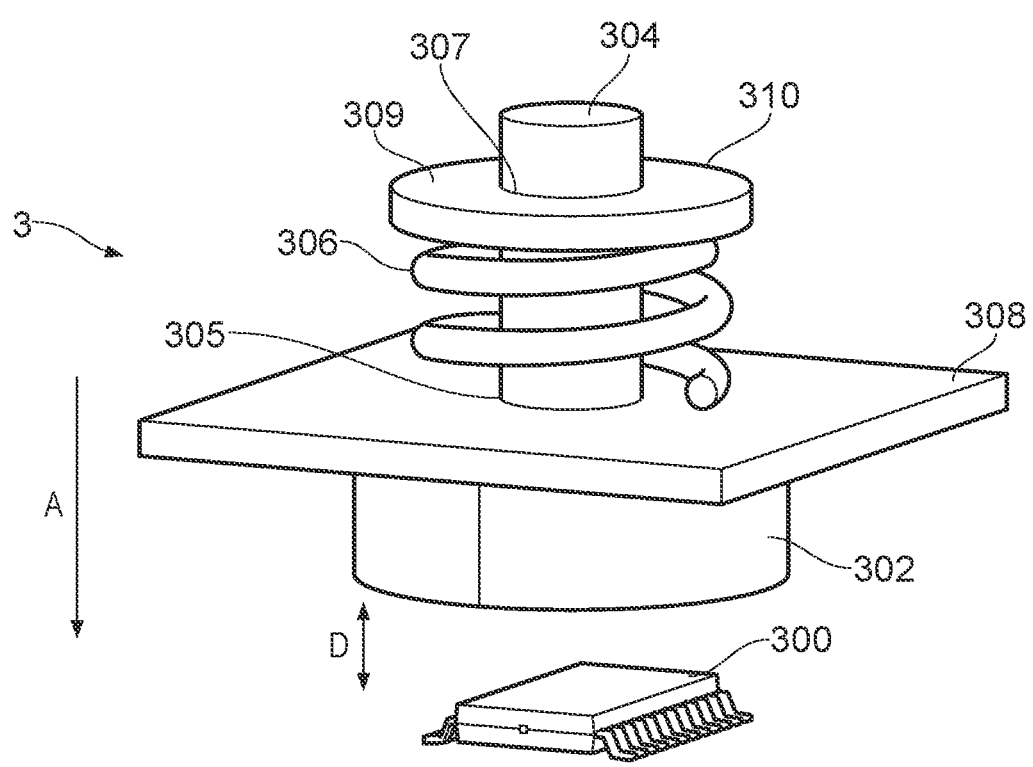
FIG. 3 is an example of magnetic sensor system in accordance with embodiments of the disclosure.

FIG. 3 illustrates a first example of a magnetic sensor system 3 according to the present disclosure. A magnetic sensor package 300 comprising a magnetic MT sensor (not shown) is provided. It will be appreciated that the magnetic sensor package 300 may contain the magnetic sensor system 1 shown in FIG. 1, with the MT sensor being the MT sensor 102. The magnetic sensor package 300 is placed below a magnet 302 mounted on the end of a rotatable shaft 304, which itself will be coupled to some mechanical system that is to be monitored. The magnet 302 is placed a first distance D above the magnetic sensor package 300, this first distance D being the working distance whereby the magnetic field strength experienced by the magnetic sensor package 300 at this distance is within the operating magnetic window in which the magnetic MT sensor will accurately output turn count information. The magnetic window is defined by a minimum magnetic flux density, Bmin, and a maximum magnetic flux density, Bmax. Below Bmin, domain wall propagation can fail, causing the turn count information to be corrupted. Above Bmax, the domain walls can be nucleated, and so in operation, the sensor will contain false turn count information.

The magnetic sensor system 3 is provided with an initialization mechanism that is configured so as to move the magnet 302 and the shaft 304 in an axial direction (denoted by arrow A) towards the sensor package 300. In doing so, the magnetic field experienced by the magnetic sensor package exceeds the Bmax of the magnetic MT sensor, thereby filling the MT sensor spiral with domain walls and magnetising the magnetoresistive elements into the initialized state. Once initialized, the magnet 302 is brought back to its starting position at the first distance D above the sensor package 300.

In this example, the initialization mechanism comprises a spring 306 positioned between a base plate 308 located just above the magnet 302 and an upper plate 310. The rotating shaft 304 is then threaded through respective holes 305, 307 in the centre of the base plate 308 and upper plate 310, the hole 305 in the base plate 308 being configured to allow the shaft 304 to rotate freely. The base plate 308 is fixed in place to some external structure (not shown) such that it cannot move in a rotational or axial direction, thereby providing an anchor for the initialization mechanism. In this respect, it will be appreciated that any suitable support structure held in a fixed axial position may be used to act as an anchor for the spring 306 and the upper plate 310. The upper plate 310 will be fixed to the rotating shaft 304 so that it can move with the shaft 304 in both a rotational and axial direction. In use, the upper plate 310 is pushed downwards towards the base plate 308 against the force of the spring 306, thereby compressing the spring 306 and pushing the magnet 302 down towards the sensor package 300 so as to increase the magnet field strength in the vicinity of the sensor package 300, and thereby initialize the MT sensor contained therein, as described above. Once the MT sensor has been initialized, the upper plate 310 is released, the spring 306 then biasing the upper plate 310, and thus the magnet 302 and shaft 304, back towards the starting position. In this respect, it will be appreciated that either the upper plate 310 or the shaft 304 may be pushed downwards against the force of the spring 306. For example, the shaft 304 may be driven axially from the end opposite to that shown in FIG. 3. Alternatively, as another example, the upper plate 310 may be mechanically actuated by some means pushing against its upper surface 309. Similarly, whilst the upper plate 310 is shown as ring-shaped, it will also be appreciated that the upper plate 310 may be any suitable form for actuating the shaft 304 in the axial direction.

Figure 4:
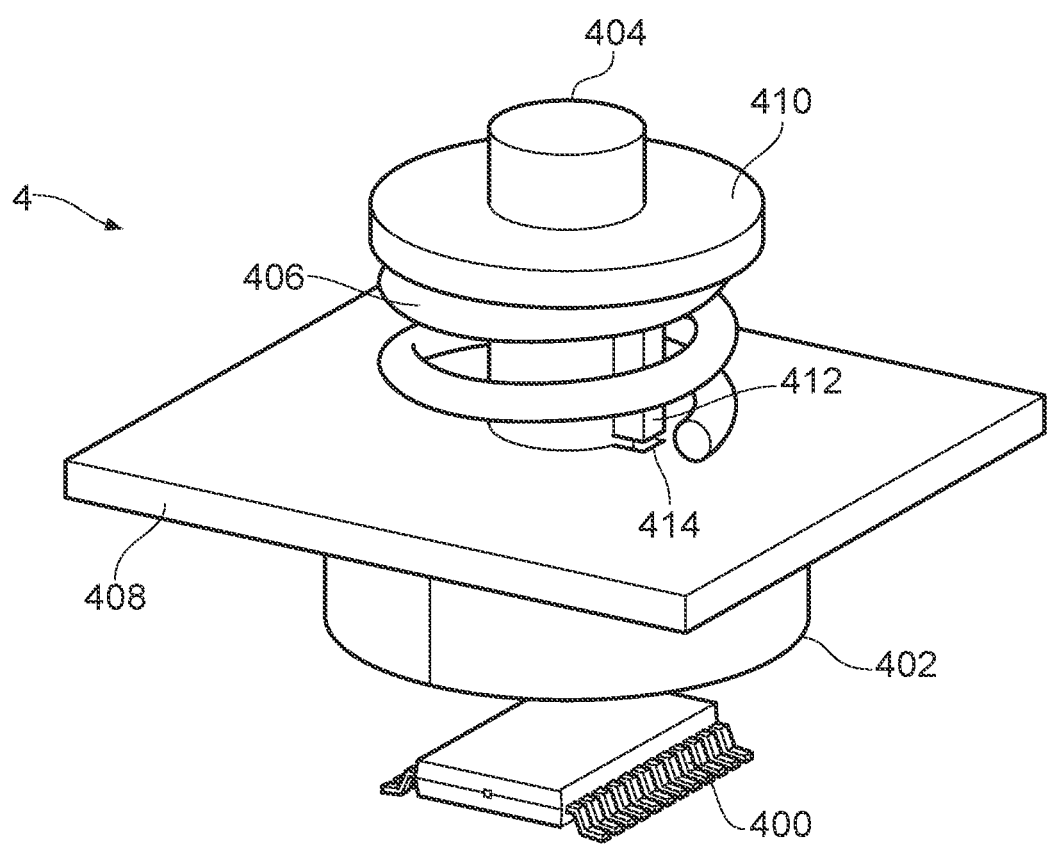
FIG. 4 is another example of magnetic sensor system in accordance embodiments of the disclosure.

FIG. 4 shows another example of a magnetic sensor system 4 according to the present disclosure. As with the example shown in FIG. 3, the magnetic sensor system 4 comprises a magnetic sensor package 400 comprising a magnetic MT sensor (not shown), wherein a magnet 402 mounted on a rotating shaft 404 is positioned directly above the magnetic sensor package 400. As before, in the starting position, the distance between the magnet 402 and the sensor package 400 is a working distance whereby the magnetic field strength experienced by the magnetic sensor package 400 is within the operating magnetic window in which the magnetic MT sensor will accurately output turn count information. As with FIG. 3, an initialization mechanism is provided, comprising a spring 406 connected between a base plate 408 and an upper plate 410. In this example, a shaft key 412 is mounted to the shaft 404 that is configured to cooperate with an opening 414 on the base plate 408. Thus, the upper plate 410 and the shaft 404 can only be moved downwards in the axial direction when the shaft key 412 aligns with the opening 414. The reason for doing this is to ensure that the initialization takes place when the magnetic field is in the correct orientation. In this respect, the magnetic field direction during initialization must correspond to the magnetic field direction when the rotatable shaft 404, and the mechanical system to which it is connected, are at either the start point (i.e. corresponding to a zero turn count) or the end point (i.e. corresponding to the maximum turn count). The shaft key 412 and opening 414 arrangement therefore ensures that the initialization is performed when the magnet 402 and shaft 404 are in the required orientation.

It will of course be appreciated that the shaft key 412 and opening 414 is one way of achieving this function, and that some other suitable alignment feature may be used.

Figure 5:
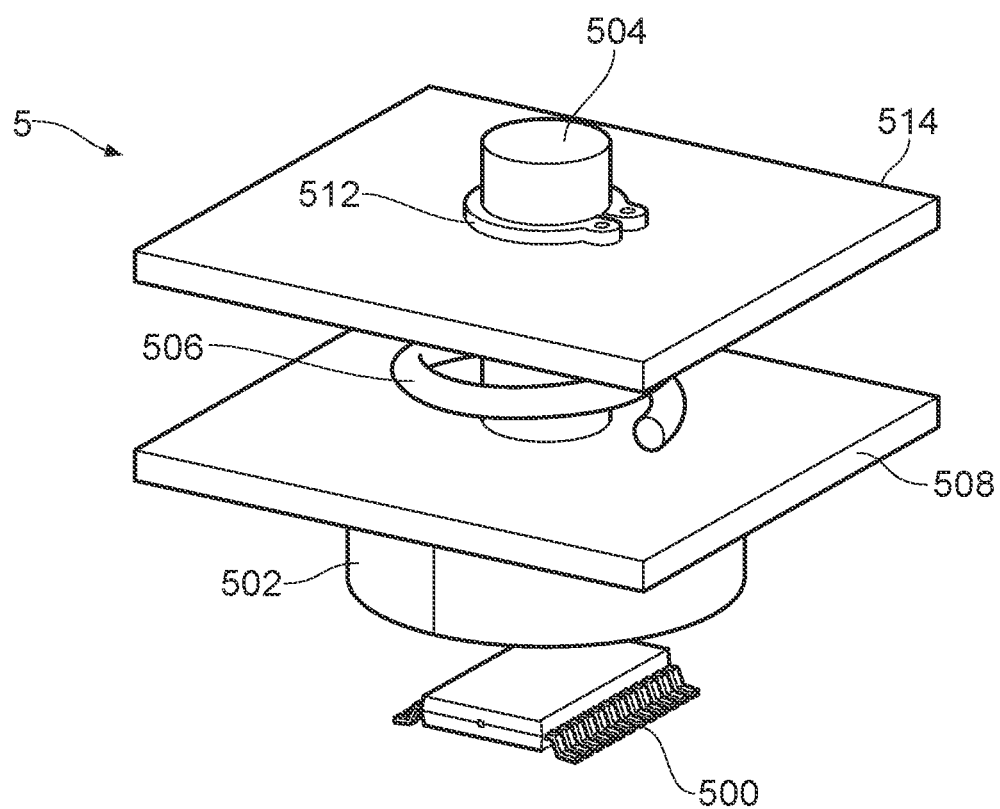
FIG. 5 is a further example of magnetic sensor system in accordance with embodiments of the disclosure.

FIG. 5 shows another example of a magnetic sensor system 5 according to the present disclosure. As with the example shown in FIG. 3, magnetic sensor system 5 comprises a magnetic sensor package 500 comprising a magnetic MT sensor, wherein a magnet 502 mounted on a rotating shaft 504 is positioned directly above the magnetic sensor package 500. As before, in the starting position, the distance between the magnet 502 and the sensor package 500 is a working distance whereby the magnetic field strength experienced by the magnetic sensor package 500 is within the operating magnetic window in which the magnetic MT sensor will accurately output turn count information. As with FIG. 3, an initialization mechanism is provided, comprising a spring 506 connected between a base plate 508 and an upper plate (not visible). In this example, a locking mechanism is provided, comprising a locking ring 512 (e.g. a retaining ring or similar) and a locking plate 514 positioned above upper plate, although it will be appreciated that some other suitable fastener or locking arrangement may be used, to hold the shaft 504 in a fixed axial position, whilst still permitting the shaft 504 to rotate. Whilst the sensor system 5 is in use, the locking ring 512 is attached to the shaft 504 and abuts against the locking plate 514 to prevent the shaft 504 from moving in the axial direction, for example, due to vibrations in the external system, whilst it is in operation. Any movement in the axial direction will cause variations in the magnetic field strength, which could cause errors in the turn count. A retaining ring or similar can thus be used to absorb any vibrations that could disrupt the turn count. Similarly, if the shaft 504 is left free to move in the axial direction during use, a sudden shock to the system could cause the sensor to initialize accidentally, again resulting in an incorrect turn count.

To initialize the sensor package 500, the locking ring 512 must be removed before the shaft 504 can be moved downwards, with the locking ring 512 being returned once initialization has taken place.

Various modifications, whether by way of addition, deletion and/or substitution, may be made to all of the above described embodiments to provide further embodiments, any and/or all of which are intended to be encompassed by the appended aspects.

For example, whilst a spring is used in the above examples, it will be appreciated that any suitable mechanism may be used that enables the magnet and shaft to be moved in an axial direction and then hold the magnet in position at the first distance above the sensor package whilst the sensor system is in use. For example, some other biasing means or a sliding mechanism could be used in place of the spring.

It will also be appreciated that the locking mechanism described with reference to FIG. 5 and the alignment feature described with reference to FIG. 4 may be used in combination.

Applications

Any of the principles and advantages discussed herein can be applied to other systems, not just to the systems described above. Some embodiments can include a subset of features and/or advantages set forth herein. The elements and operations of the various embodiments described above can be combined to provide further embodiments. The acts of the methods discussed herein can be performed in any order as appropriate. Moreover, the acts of the methods discussed herein can be performed serially or in parallel, as appropriate. While circuits are illustrated in particular arrangements, other equivalent arrangements are possible.

Any of the principles and advantages discussed herein can be implemented in connection with any other systems, apparatus, or methods that benefit could from any of the teachings herein. For instance, any of the principles and advantages discussed herein can be implemented in connection with any devices with a need for correcting rotational angle position data derived from rotating magnetic fields. Additionally, the devices can include any magnetoresistance or Hall effect devices capable of sensing magnetic fields.

Aspects of this disclosure can be implemented in various electronic devices or systems. For instance, phase correction methods and sensors implemented in accordance with any of the principles and advantages discussed herein can be included in various electronic devices and/or in various applications. Examples of the electronic devices and applications can include, but are not limited to, servos, robotics, aircraft, submarines, toothbrushes, biomedical sensing devices, and parts of the consumer electronic products such as semiconductor die and/or packaged modules, electronic test equipment, etc. Further, the electronic devices can include unfinished products, including those for industrial, automotive, and/or medical applications.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual embodiment (assuming that the functionality of the depicted circuits is not adversely affected). The words "based on" as used herein are generally intended to encompass being "based solely on" and being "based at least partly on." Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

While certain embodiments have been described, these embodiments have been presented by way of example only, and are not intended to limit the scope of the disclosure, indeed, the novel apparatus, systems, and methods described herein may be embodied in a variety of other forms. Furthermore, various omissions, substitutions and changes in the form of the methods and systems described herein may be made without departing from the spirit of the disclosure.

The invention claimed is:

1. A magnetic sensor system, comprising:
a magnetic sensing device, the magnetic sensing device at least comprising a magnetic multi-turn sensor, wherein the magnetic multi-turn sensor comprises a plurality of magnetoresistive sensing elements;
a magnet mounted on a rotatable shaft, the magnet being positioned a first distance from the magnetic sensing device such that the magnetic multi-turn sensor is operable to measure a number of turns of a magnetic field generated by the magnet; and an initialization mechanism configured to move the magnet and the rotatable shaft in an axial direction towards the magnetic sensing device, without requiring rotation of the rotatable shaft, such that when the magnet is at a second distance from the magnetic sensing device, domain walls are generated in the plurality of magnetoresistive elements by the magnet field generated by the magnet.

2. The magnetic sensor system according to claim 1, wherein the first distance is greater than the second distance.

3. The magnetic sensor system according to claim 1, wherein the magnetic multi-turn sensor has an operating window between a first magnetic field strength and a second magnetic field strength, and wherein the magnet field strength experienced by the magnetic sensing device when the magnet is at the second distance is larger than the second magnetic field strength of the operating window.

4. The magnetic sensor system according to claim 1, wherein the initialization mechanism comprises a moveable element configured to actuate the shaft in the axial direction without requiring rotation of the shaft.

5. The magnetic sensor system according to claim 4, wherein the initialization mechanism further comprises:
a support element arranged around the rotatable shaft and held in a fixed axial position; and
a biasing element coupled between the support element and the moveable element, the biasing element being configured to bias the moveable element into a first position, wherein the magnet is at the first distance when the moveable element is in the first position.

6. The magnetic sensor system according to claim 5, wherein the biasing element is a spring.

7. The magnetic sensor system according to claim 1, wherein the initialization mechanism comprises an alignment mechanism configured to hold the magnet and rotatable shaft in a predefined angular position when the rotatable shaft is being moved in the axial direction towards the magnetic sensing device.

8. The magnetic sensor system according to claim 7, wherein the alignment mechanism comprises:
a key attached to a side of the rotatable shaft; and
an opening on a support element arranged around the rotatable shaft and held in a fixed axial position, wherein the opening is configured to receive the key when the shaft is moved in the axial direction towards the magnetic sensing device.

9. The magnetic sensor system according to claim 1, wherein the initialization mechanism comprises a locking mechanism configured to hold the rotatable shaft at a first axial position such that the magnet is at the first distance from the magnetic sensing device, wherein the locking mechanism is unlocked to allow the magnet and the rotatable shaft to be moved in the axial direction.

10. The magnetic sensor system according to claim 9, wherein the locking mechanism comprises a retaining ring.

11. The magnetic sensor system according to claim 1, wherein the magnetic multi-turn sensor is a giant magnetoresistive (GMR) or tunnel magnetoresistive (TMR) based multi-turn sensor.

12. A method of initializing a magnetic sensing device, the method comprising:
providing a magnet on a rotatable shaft;
providing a magnetic sensing device at least comprising a magnetic multi-turn sensor, wherein the magnetic multi-turn sensor comprises a plurality of magnetoresistive sensing elements, wherein the magnetic sensing device is positioned a first distance from the magnet such that the magnetic multi-turn sensor is operable to measure a number of turns of a magnetic field generated by the magnet; and
operating an initialization mechanism configured to move the magnet and the rotatable shaft in an axial direction towards the magnetic sensing device, without requiring rotation of the rotatable shaft, such that when the magnet is moved to a second distance from the magnetic sensing device, domain walls are generated in the plurality of magnetoresistive elements by the magnet field generated by the magnet.

13. The method according to claim 12, wherein the first distance is greater than the second distance.

14. A method according to claim 12, wherein the initialization mechanism comprises a moveable element configured to actuate the shaft in the axial direction without requiring rotation of the shaft.

15. The method according to claim 14, wherein the initialization mechanism further comprises:
a support element arranged around the rotatable shaft and held in a fixed axial position; and
a biasing element coupled between the support element and the moveable element, the biasing element being configured to bias the moveable element into a first position, wherein the magnet is at the first distance when the moveable element is in the first position.

16. The method according to claim 15, wherein the biasing element is a spring.

17. The method according to claim 12, wherein the initialization mechanism further comprises an alignment mechanism configured to hold the magnet and rotatable shaft in a predefined angular position when the rotatable shaft is being moved in the axial direction towards the magnetic sensing device.

18. The method according to claim 17, wherein the alignment mechanism comprises:
a key attached to a side of the rotatable shaft; and
an opening on a support element arranged around the rotatable shaft and held in a fixed axial position;
wherein the method further comprises aligning the key with the opening, such that the opening receives the key when the shaft is moved in the axial direction towards the magnetic sensing device.

19. The method according to claim 12, wherein the initialization mechanism further comprises a locking mechanism configured to hold the rotatable shaft at a first axial position such that the magnet is at the first distance from the magnetic sensing device, and wherein the method further comprises unlocking the locking mechanism to allow the magnet and the rotatable shaft to be moved in the axial direction.

20. The method to claim 19, wherein the locking mechanism comprises a retaining ring.

* * * * *